April 14, 1970 — D. R. SMITH — 3,506,016
CIGAR HEAD FORMING FOR CIGAR TIPPING
Filed Feb. 16, 1968 — 5 Sheets-Sheet 1

INVENTOR.
DALE R. SMITH
BY
Paul & Paul
ATTORNEYS.

INVENTOR.
DALE R. SMITH
BY
Paul + Paul
ATTORNEYS.

April 14, 1970          D. R. SMITH          3,506,016
CIGAR HEAD FORMING FOR CIGAR TIPPING
Filed Feb. 16, 1968          5 Sheets-Sheet 4
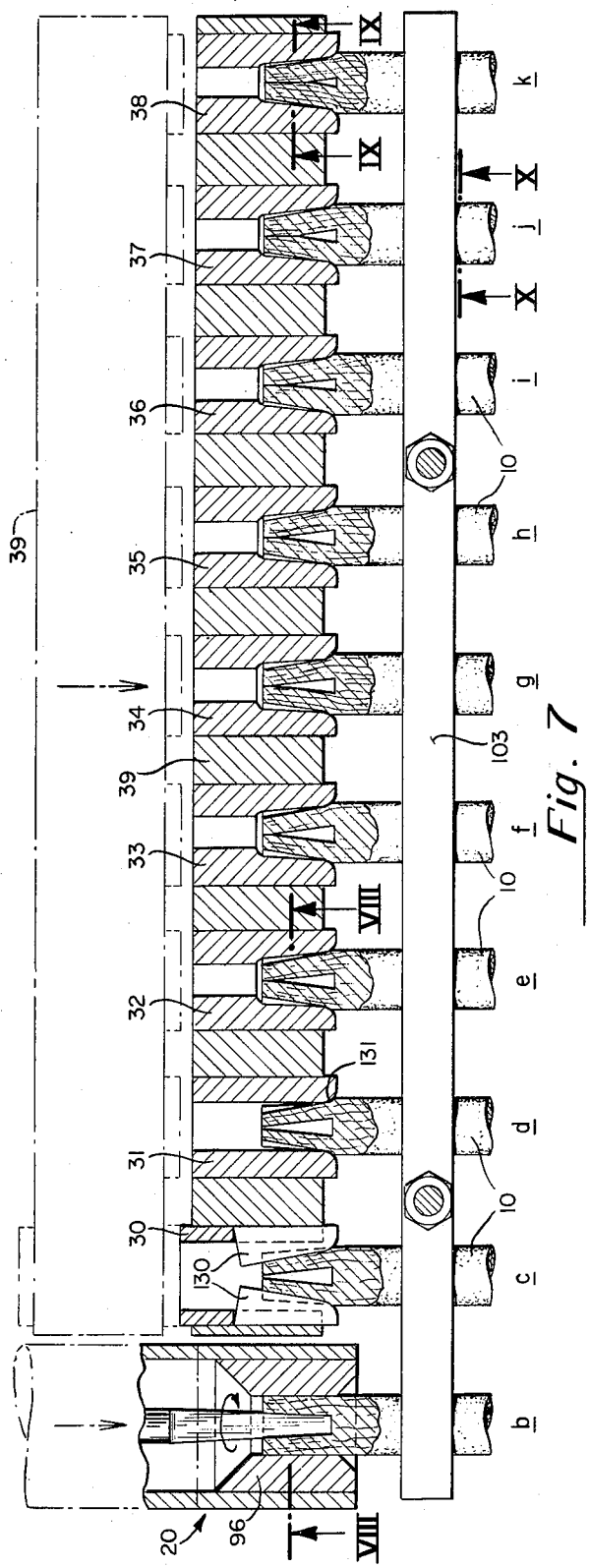
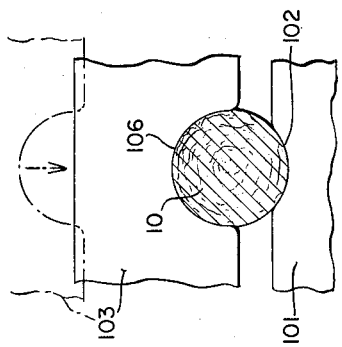
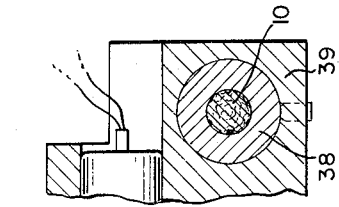
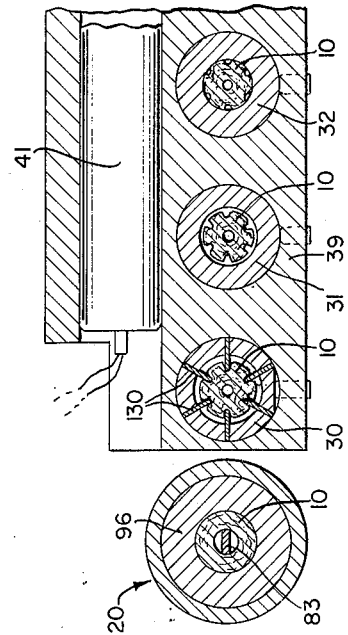
INVENTOR.
DALE R. SMITH
BY *Paul + Paul*
ATTORNEYS.

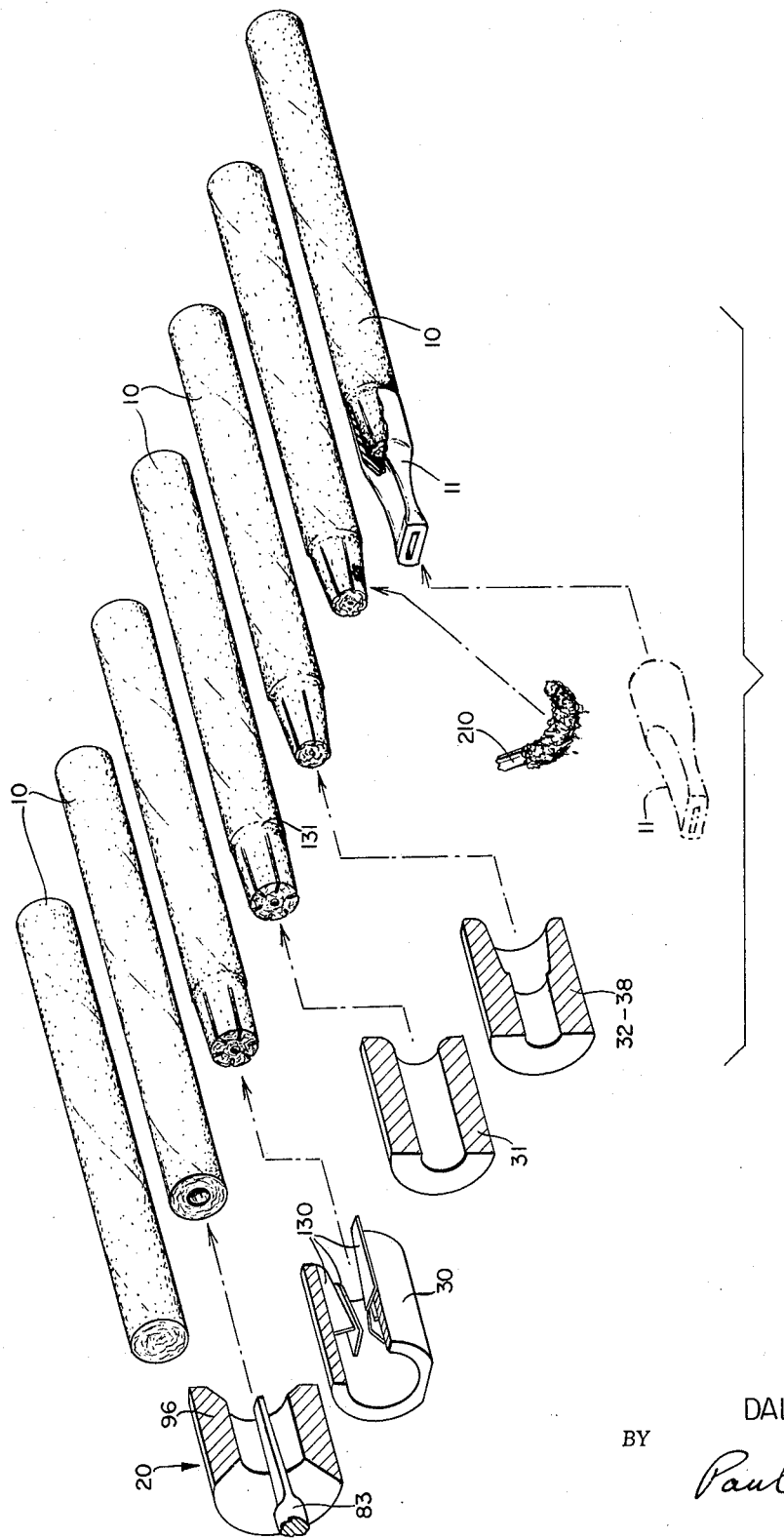

United States Patent Office 3,506,016
Patented Apr. 14, 1970

3,506,016
CIGAR HEAD FORMING FOR CIGAR TIPPING
Dale R. Smith, York, Pa., assignor, by mesne assignments, to York Production Engineering Company, Inc., Windsor, Pa., a corporation of Pennsylvania
Filed Feb. 16, 1968, Ser. No. 706,061
Int. Cl. A24c *1/18, 1/32*
U.S. Cl. 131—92
16 Claims

ABSTRACT OF THE DISCLOSURE

An apparatus is disclosed for forming the head of a cigar to receive a plastic tip. The open head of the cigar is first bored on the center axis. However, it may not be necessary to bore where the cigar is loosely packed. A group of pleats is then formed about the head by a heated pleating die. Then the pleated head is progressively heat formed by a series of compression of forming dies to which the cigar head is successively presented. Each successive die has an interior diameter smaller than that of the die immediately preceding it. These dies are moved reciprocally on the longitudinal axis of the cigar at each of the successive forming stations, while the cigar is clamped against the thrust of the die.

BACKGROUND OF THE INVENTION

This invention relates generally to apparatus for tipping cigars. More particularly, the invention relates to that portion of cigar tipping apparatus having to do with forming the head of the cigar to receive the tip, usually a plastic tip.

DESCRIPTION OF THE PRIOR ART

It is desirable, from an appearance, handling, and sales viewpoint, that the outside diameter of the cigar plastic tip be not substantially larger than the outside diameter of the straight body portion of the open-ended cigar so as to avoid the shoulder which would otherwise be present at the junction of the cigar and plastic tip. To avoid such a shoulder, it is known in the prior art to form or shape the head of the open-ended cigar. But prior art head formers or shapers have been moved back and forth in a plane located at the cigar head perpendicular to the cigar axis. Some of the prior-art head formers use two forming dies which approach the head of the cigar from opposite directions. Others use four forming dies which approach the head of the cigar along four axes spaced 90° apart. Such prior art formers, whether of the two-die or four-die types, have formed but two pleats in the head of the cigar, 180° apart circumferentially. Each of these two pleats had to be relatively deep since all of the tobacco wrapper which is moved at the head when the head is compressed into smaller diameter, had to go into the valleys of the two pleats. Such deep prior-art pleats tend to communicate with the ambient air outside the wrapper below the lower limit of the plastic tip, and tend in many cases to provide an undesired, unwanted air passage which extends completely through the plastic tip, thereby preventing good cigar draft.

SUMMARY OF THE INVENTION

In contrast to the prior-art head formers referred to hereinabove, the head-forming apparatus of the present invention performs three basic steps: First, it drills a hole in the head of the cut cigar on the center axis thereof, to make room for tobacco to move thereinto during compression of the head. Second, a group of relatively shallow pleats are formed in the tobacco wrapper at regularly spaced intervals circumferentially about the head of the cigar. At least four, and preferably six or eight pleats are formed. Third, the pleated head of the cigar is then progressively shaped or formed by moving a succession of progressively shaped, heated, forming dies reciprocally on the lengthwise axis of the cigar to compress progressively the cigar head. During this circumferential compression, cigar wrapper material is pressed or caused to flow into the pleats, but because there are eight pleats, rather than two as in the prior art, each pleat receives but a small fraction of the tobacco wrapper material that has to be accommodated by reason of the compression and reduction in diameter of the cigar.

Since each pleat of the multiple number of pleats is less deep than in the case of the prior-art cigar, there is substantially less likelihood that the pleat will form an unwanted air passage through the tip from outside the wrapper. This is further prevented by forming the cigar head to mate with the interior of the plastic tip, particularly at the lower end of the tip, and by abutting the lower edge of the plastic tip against a shoulder formed inwardly in the cigar wrapper.

BRIEF DESCRIPTION OF THE DRAWING

FIG. 7 is an enlarged plan view looking down on the drill and tool or die holder and showing the drill and die holder in forward or working position;

FIG. 8 is an elevational view in section of drill head, pleating die, and first and second forming dies, looking along the line VIII—VIII of FIG. 7;

FIG. 9 is an elevational view, in section, of the eighth or last forming die, looking along the line IX—IX of FIG. 7;

FIG. 10 is an elevational view in section along the line X—X of FIG. 7 showing the cigar being clamped between the upper and lower hold-down bars;

FIG. 11 is a view in section along the line XI—XI of FIG. 2 showing how the horizontal drive bar is clamped to the vertical drive bar;

FIG. 12 is a view in section along the line XII—XII of FIG. 2 showing how the vertical drive bars are pivotally secured to the tool holder drive shaft;

FIG. 13 is a series of perspective diagrammatic views illustrating the steps of drilling, pleating, progressively forming, gluing and tipping the cigar.

DESCRIPTION OF THE PREFERRED EMBODIMENT

Figure 1:
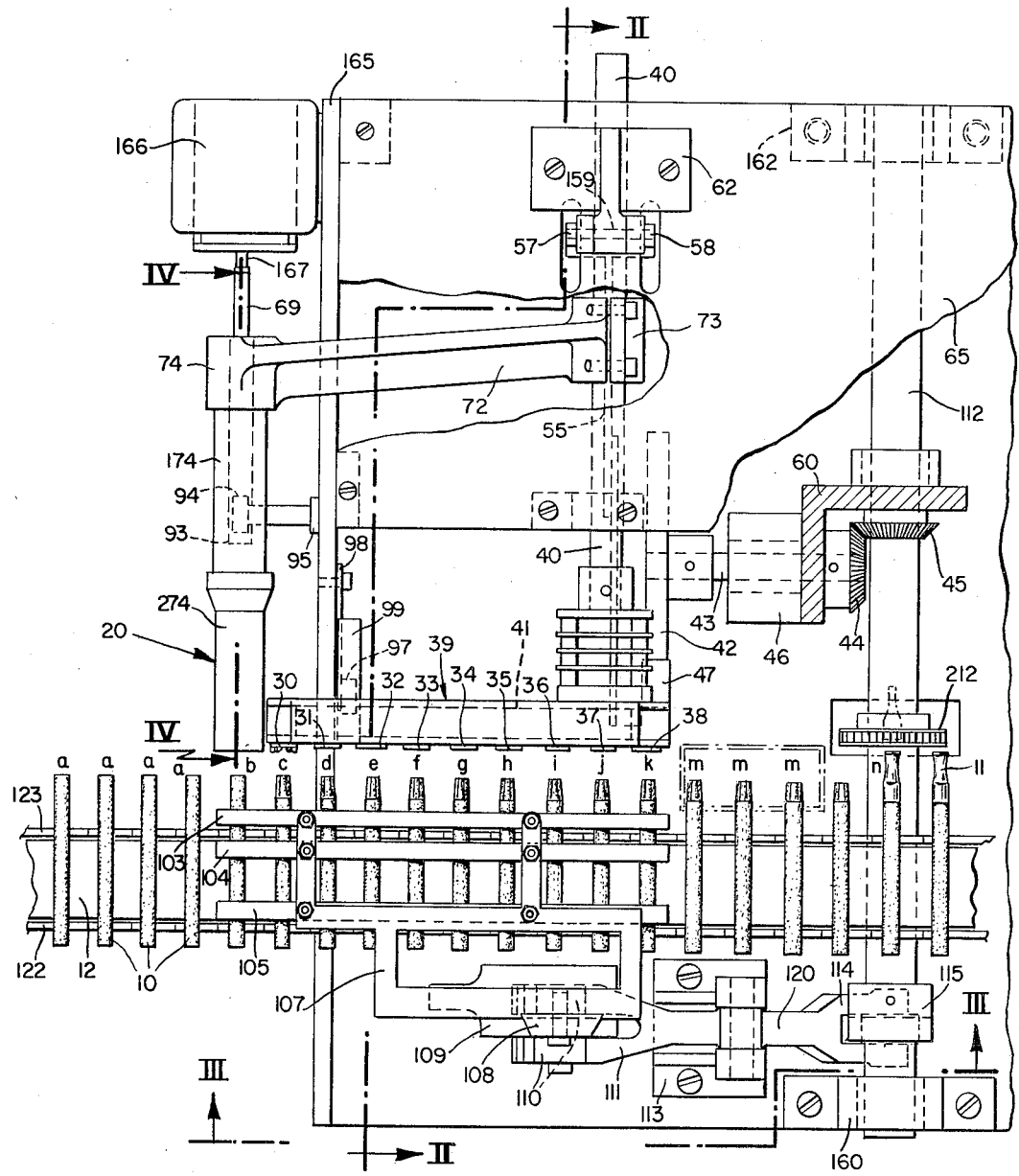
FIG. 1 is a plan view of the head forming portion of a cigar tipping apparatus according to the present invention.

Referring first to FIGURE 1, a succession of cigars 10 are supported on an elongated platform or table 12 and are moved forward (from left to right as viewed in FIG. 1) in intermittent step-by-step fashion by a cyclic square-motion rack mechanism similar to that shown and described in my U.S. Patent 3,095,884, granted July 2, 1963 entitled "Cigar Tipping Machine." Various stations have been indicated in FIG. 1 by the reference letters *a* through *n*. At the four stations identified as *a* which precede the drilling, pleating and forming stations *b–k*, the cigar 10 is a cylindrical structure open at both ends as a result of having been cut from a longer length.

At station b, the head of the cigar is drilled on its axial center by drill 20. At station c, the head of the cigar is pleated at circumferential spacings by the pleating die 30 carried by the toolholder 39. At stations d through k the head of the cigar is successively and progressively shaped or formed by the forming dies 31–38 which are carried by the same toolholder 39 which carries the pleating die 30. The forming dies 31–38 apply circumferential pressure in the presence of heat to progressively reduce, shape and set the head of the cigar. The heat is provided by a heater 41, preferably electrical, carried on the toolholder 39.

At the three stations identified as m, glue is applied to the head of the cigar 10, and at station n the plastic tip 11 is applied. The plastic tips 11 are supplied to the tipping station n by a chute-type magazine (not shown) similar to that shown in FIG. 2 of my Patent 3,095,884.

The present invention is concerned with the forming of the head of the cigar to prepare the cigar to receive the plastic tip. As previously indicated, three basic steps are involved. The first step is that of drilling the head of the cigar to produce an axial cavity to allow room for flowing tobacco thereinto when the head of the cigar is compressed and reduced in diameter. The second basic step is that of putting folds or pleats in the tobacco wrapper around the head of the cigar at a plurality of circumferential points, preferably equally spaced. In the drawing (see FIG. 8) the pleating die 30 is illustrated as having six pleating bars at 60° spacings. However, for a larger size of cigar, the pleating die would preferably have eight pleating bars at 45° spacings. The present invention is not limited to a particular number of pleats. Any reasonable number may be used. The third basic step is that of progressively compressing and forming the head by the application of a succession of circumferential pressures, in the presence of heat, to reduce, shape and set the head of the cigar to receive the plastic tip. In the drawing, eight forming dies 31–38 are shown for progressively shaping and reducing the head of the cigar, to conform it to the interior of the plastic tip.

An important aspect of the present invention is that the forming dies are reciprocated on the longitudinal axis of the cigar rather than at right angles thereto. This allows important simplification and hence economy to be realized in the design and construction of the head-forming apparatus.

In FIG. 1, the drill 20, pleating die 30, and forming dies 31–38 are shown in retracted or non-working positions. In FIG. 7, the drill 20, pleating die 30, and forming dies 31–38, are shown (in solid line) in their forward or working positions. The retracted or non-working positions are indicated in phantom.

The pleating die 30 and the forming dies 31–38 are carried by a common tool or die holder 39 and are driven reciprocally and in unison between a forward working position and a retracted or non-working position. As previously indicated, the tool or die holder 39 also carries a heater 41 which provides the heat necessary to facilitate forming of the head of the cigar by the pleating and forming dies and to heat set the formed head.

The tool or die holder 39 is fixed to the forward end of a horizontal shaft 40 which is driven reciprocally back and forth under the control of a cam 42 which is mounted on a pinned to a cross shaft 43 journalled in a bearing 46 shown in FIG. 1 and supported by the machine frame 60. Cross shaft 43 has pinned thereto a bevel gear 44 which meshes with and is driven by a bevel gear 45 fixed on and driven rotationally by the main drive shaft 112. Main shaft 112 is journalled for rotation in the pedestals 160 and 162, and driven by the drive chain 212.

Figure 2:
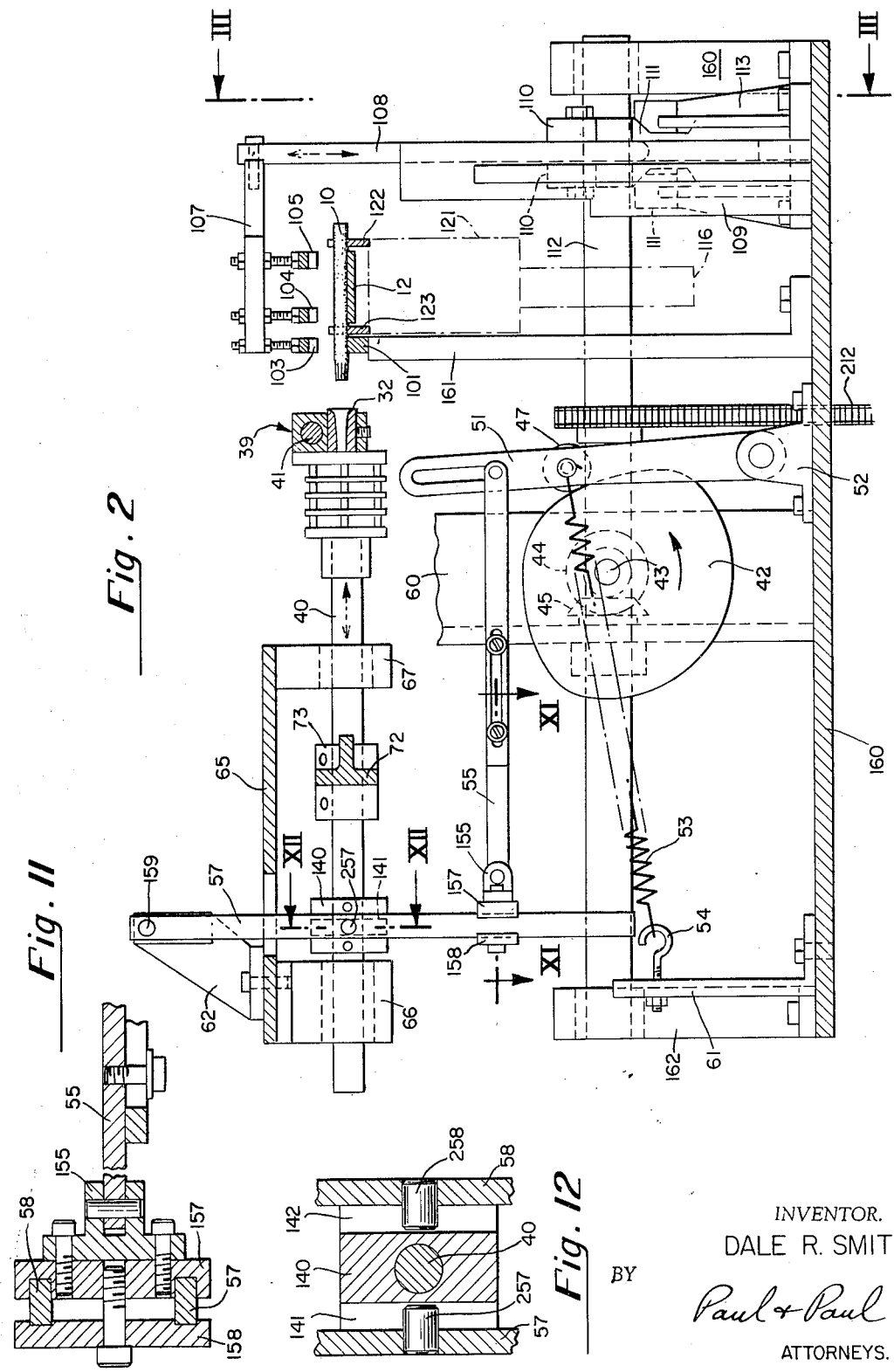
FIG. 2 is a side elevational view along the line II—II of FIG. 1 looking in the direction of the arrows.

As seen is FIG. 2, when the cam 42 is driven rotationally by the means just described, a vertically disposed lever 51, which is mounted for pivotal movement in a support 52 and which carries the cam follower 47, is caused to move back and forth, in the rearward and forward directions. The cam follower 47 is held against the cam 42 by a tension spring 53 the rearward end of which is secured to a hook 54 secured in a rear pedestal 61 fixed to the base 160 of the machine.

The back-and-forth reciprocating motion of the lever 51, driven and controlled by the cam 42, causes a corresponding reciprocating motion of a horizontally disposed adjustable drive bar 55, the forward end of which is pivotally connected to the lever 51 and the rearward end of which is pivotally connected to a vertical drive bar assembly comprising a pair of spaced-apart vertically disposed bars 57 and 58.

FIG. 11 is a view in section looking along the line XI—XI of FIG. 2, showing how the horizontal drive bar 55 is pivotally connected to the pair of vertical drive bars 57 and 58. It will be seen that a yoke member 155, which is pivotally connected to the end of the drive bar 55, is connected to one member 157 of a pair of clamp members 157 and 158. The vertical drive bars 57 and 58 are supported from their uppermost ends, these ends being pivotally connected at 159 to a bracket 62 which is fixed to the top plate 65 of the machine frame.

Secured to the under side of the frame top plate 65 at spaced locations are bearings 66 and 67 which support the toolholder drive shaft 40 for reciprocating motion. The upright drive bars 57 and 58 are pivotally secured to the drive shaft 40 in a manner shown in section in FIG. 12. A grooved block 140 is fixed to the shaft 40 and has opposing grooves 141 and 142 which receive the pins 257 and 258 of the vertical drive bars 57 and 58. The lower ends of the vertical drive bars 57 and 58 are free. It will be seen that as the lever 51 pulls and pushes the horizontal drive bar 55 forward and rearward, the vertical drive bars 57 and 58 are pulled and pushed along an arcuate path, the center point of which is the pivot point 159. The pivotal connection to bar 55 at 155, shown in detail in FIG. 11, and the sliding nature of the pivotal connection to shaft 40 at 140, shown in detail in FIG. 12, accommodate the arcuate motion of the bars 57 and 58 to the reciprocating horizontal movement of bar 55 and shaft 40.

It should be understood that the structure of the pivotal connections just described are but examples of suitable structural forms of connection, and that so far as the invention claimed is concerned, other forms of structure may be employed.

In the manner just described, the multiple tool holder 39 carrying the pleating die 30 and the forming dies 31–38 (and also carrying the heater 41) is moved, under the control of cam 42, from the retracted non-working position, shown in FIG. 1 (and in phantom in FIG. 7) to the forward working position shown in solid line in FIG. 7. Cam 42 is shaped to provide a dwell at the forward position to allow some time to heat set the shape of the cigar head. Continued rotation of cam 42 then allows the spring 53 to pull back the lever 51, and during this retraction the cigars are moved one step forward along the table 12, from left to right as viewed in FIG. 1, to advance each cigar 10 to the next station. Support for the reciprocal movement of the toolholder 39 is provided by a roller 97 which is carried at the forward end of a pivotally adjustable bracket 98 secured to the sidewall 165. Roller 97 engages and supports the undersurface of a plate 99 which is secured to the undersurface of the toolholder 39.

As the multiple toolholder 39 is reciprocated between retracted non-working position and forward working position, by the reciprocating action of drive shaft 40, the drill 20 is reciprocated back and forth in coordination therewith. This coordination of movement is accomplished by mounting the drill 20 on the reciprocating drive shaft 40 by means of a support bracket 72 one end 73 of which is clamped to the shaft 40 for reciprocation therewith, and the other end 74 of which is connected to the drill 20.

Figure 4:
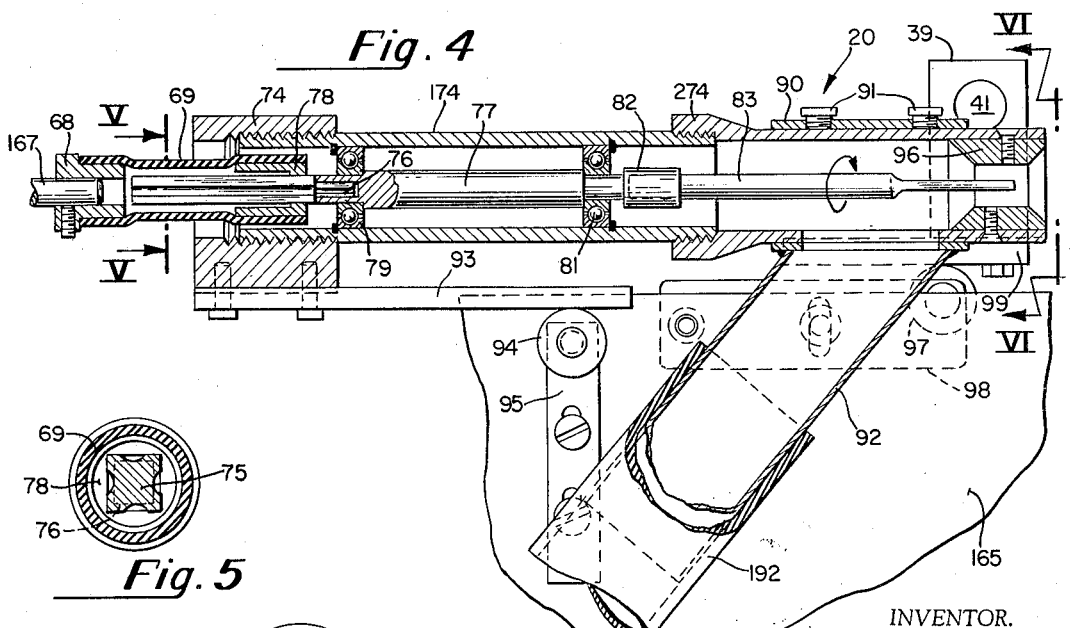
FIG. 4 is a side elevational view of the drill of the head forming apparatus looking along the lines IV—IV of FIG. 1.
Figure 5:
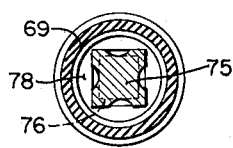
FIG. 5 is a view in section at the drive end of the drill looking along the line V—V of FIG. 4.
Figure 6:
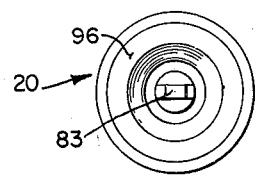
FIG. 6 is a view of the drill tip looking in along the line VI—VI of FIG. 4.

The structure details of the drill 20 are shown in section in FIG. 4. The motor 166 (FIG. 1), which is supported on the sidewall 165 of the machine frame, drives a shaft 167 having fixed thereto an adapter 68 which is connected to the rear end of a flexible connection 69 which extends forwardly and is connected at its forward end to a drive sleeve 78 having therein a square axial hole through which extends a square shaft 75. Shaft 75 has a reduced forward end portion 76, also of square cross-section, which is received within a square cross-section recess in the rearward end portion of a spindle 77, which is journalled for rotation in bearings 79 and 81 in the housing 174 which is secured at its rearward end to the end 74 of the bracket 72. Spindle 77 carries at its forward end a toolholder 82 which receives the shank end of the drill or boring tool 83. A forward housing 274, secured to the housing 174, carries at its forward end a replaceable guide insert 96 which supports the head of the cigar during the drilling operation. A roller 94 carried at the upper end of a bracket 95 engages the underside of a plate 93 which is secured to and extends forwardly from the end 74 of bracket 72, thereby providing support for the drill assembly as it is moved back and forth. A sleeve 90 is secured to the housing 274 by set screws 91. Sleeve 90 has an opening on its underside which communicates with a tube 92 which connects to a suction line 192, the purpose of which is to discharge the tobacco which is bored from the head of the cigar.

It will be seen, by referring to FIGS. 1, 2 and 4, that when the multiple toolholder 39 is reciprocated by shaft 40 under the action and control of the cam 42, the drill support bracket 72 is carried reciprocally with the shaft 40. This causes a coordinated reciprocating movement of the connected drill housings 174 and 274, which drive, through the bearings 79 and 81, the spindle 77 and the boring tool 83, in a responding reciprocal movement. When the spindle 77 is moved forward, the adapter 68 and flexible connection 69 remain axially fixed, but the square cross-section shaft 75 is pulled forward part way through the square hole of the drive sleeve 78. In this way, connection is maintained between the spindle 77 and the motor drive shaft 67. The purpose of the flexible connection 69 is to accommodate some degree of misalignment between the axis of the motor shaft 67 and the axis of the boring tool 83.

It will be understood that during the cyclic period in which the drill 20 and multiple toolholder 39 carrying the pleating and forming dies are being reciprocated between rearward non-working and forward working positions, other portions of the machine are performing coordinated tasks. During the working portion of the cycle, the cigars are held or clamped in aligned position at the station against the thrust of the drill, peating die, and forming dies. During the non-working portion of the cycle, the cigars are shifted one step forward.

Figure 3:
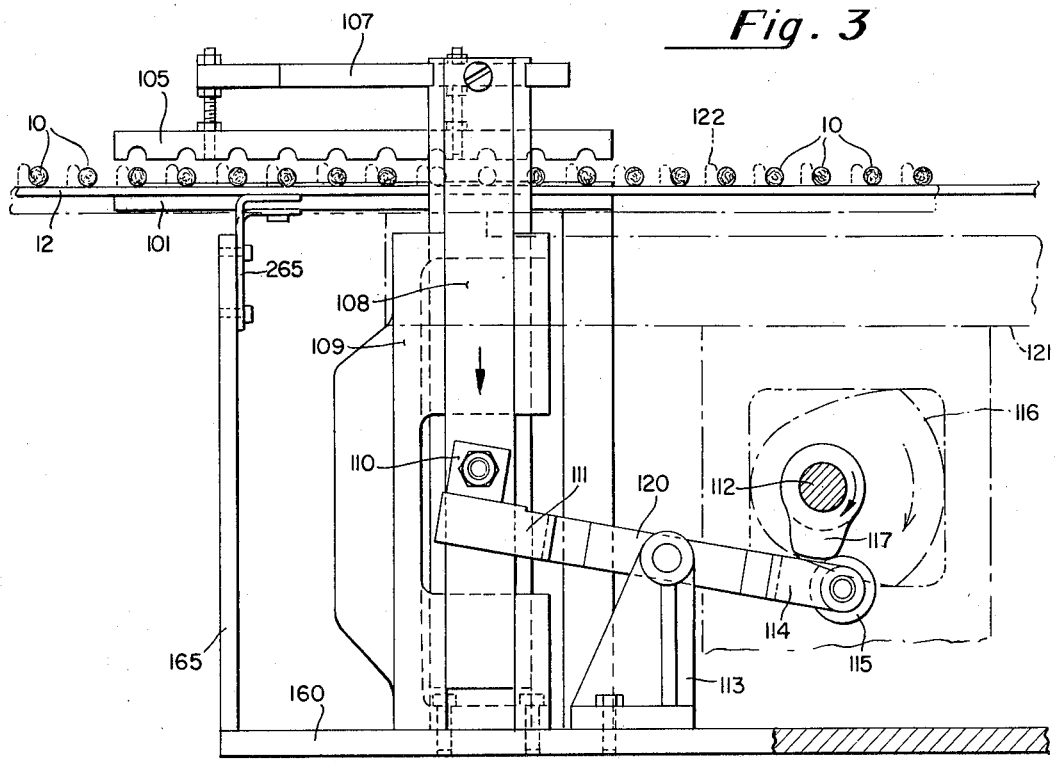
FIG. 3 is a front elevational view of the head forming apparatus looking along the line III—III of FIG. 1.

The mechanism by which the cigars are clamped or held down during the working portion of the cycle is basically similar to that shown in my U.S. Patent 3,095,884, previously referred to. As previously indicated, the cigars 10 are supported on an elongated platform or table 12 which is supported by brackets to the sidewalls of the frame, see for example, bracket 265 supporting the table 12 on sidewall 165, as seen in FIG. 3. Located at the inward or tool side of table 12 is a so-called lower hold-down bar 101 supported on the frame members 161 and 165. Bar 101 is an elongated bar having shallow recesses 102 spaced to align with the center axis of the tool at the working stations. A portion of bar 101 is seen in FIG. 10. The bottom of the recess 102 is at the same level as the top of the table 12 so that when the cigars 10 are at a working station, the cigar is horizontally level, with the forward or head end of the cigar being received into the shallow recess 102. Recess 102 thus functions as an aligning or indexing recess.

During the working portion of the cycle, the cigars 10 are clamped at the working stations by a so-called upper hold-down mechanism which includes three elongated bars 103, 104 and 105 which are supported in depending position above the table 12. The innermost bar 103 lies in the same vertical plane as the lower hold-down bar 101. The other two bars 104 and 105 are positioned above the platform or table top 12. Each of the bars 103, 104 and 105 is provided with recesses at spaced apart intervals corresponding to the spacing between working stations. Each recess is generally semi-circular in cross-section and of a size to receive the body of the cigar. One of these recesses identified by the reference numeral 106 is seen in FIG. 10.

As seen in FIGS. 1, 2 and 3, the upper hold-down bars 103, 104 and 105 are supported adjustably from a horizontal frame member 107 which is screwed to the upper end of a wedge-shaped slide 108. Slide 108 is movable up and down in a slide guide 109 mounted on the base 160 of the machine frame.

Secured to the lower end of slide 108, on opposite faces thereof, are rotatably movable or pivotable blocks 110 which are engaged by the fingers of the yoke end 111 of a lever 120 which is pivotally supported in a support pedestal 113 mounted on the base 160. The other end of lever 120 is also bifurcated forming the yoke 114 which carries between its fingers the roller 115.

As seen in FIG. 3, roller 115 is engaged by a cam 117 fixed to the main drive shaft 112. In FIG. 3, the raised portion or ear of the cam 117 is shown in engagement with the roller 115. Such engagement drives the yoke end 114 down and raises the yoke end 111, thereby raising the slide 108 and lifting the upper hold-down bars 103, 104 and 105 to the elevated position shown in FIG. 2. At this portion of the cycle, the toolholder 39 and drill 20 are in retracted positions, as indicated in FIG. 2.

During the time period that the drill 20 and toolholder 39 are in retracted non-working position, and the upper hold-down bars 103–105 are in elevated position, as just described, the cigars 10 are moved one station forward, from left to right as viewed in FIG. 1. This forward movement is accomplished by a square-motion mechanism substantially identical to that shown in FIGURES 30–37 of my U.S. Patent 3,095,884. This square motion is controlled by a cam 116 which is fixed to the main drive shaft 112. This cam 116 is seen in FIGS. 2 and 3 of the present application and may be assumed to be the same cam as cam 116 of my Patent 3,095,884. In my said patent, the main drive shaft is identified as 112 which is the same reference numeral as used in the present application.

The function of the square-motion cam 116 is (1) to lift a rack 121, (2) move the lifted rack 121 one station to the right, (3) lower the rack, and (4) return the lowered rack one station to the left, to complete the cycle. This is accomplished (as will be seen by referring to my U.S. Patent 3,095,884) by placing the cam 116 within a cam-follower frame having upper, right-hand, lower, and left-hand members which are engaged in succession by the raised portion of the cam 116 to cause the square motion referred to above.

Since the square-motion mechanism is adequately shown and described in my Patent 3,095,884, the mechanism is but diagrammatically illustrated in the present application and will be but briefly described. The rack assembly 121 comprises a pair of rakes, a front rake 122 located at the front edge of the table 12 and a rear rake 123 located at the rear edge of the table. The square-motion cam 116 is so shaped and so oriented on the main shaft 112 relative to the other cams (i.e. relative to the die-holder cam 42 and to the hold-down cam 117) that, as the drill 20 and die holder 39 are retracted under the control of cam 42, and as the hold-down bars 103–105 are raised above the cigars under the control of cam 117, the rakes 122 and 123 are raised from a lower level below the table to an upper level at which the cigars on the table lie at the roots of the rakes and the fingers of the rakes project above the cigars, as is indicated in phantom in FIG. 3. The rack assembly 121 is then moved under the control of the cam 116 to the right, the fingers of the rakes 122, 123 moving the cigars along the table from one working station to the next. The rack assembly is then lowered to a lower position at which the tips of the fingers of the rakes are below the table, with the cigars resting on the table with their heads resting in the indexing recesses 102 of the lower hold-down bar 101. In this manner, the cigars are moved from one station to the next, and are aligned at the stations with the axes of the drill, pleating die, and forming dies. Following the forward step of the cigars along the table, the hold-down bars 103–105 are lowered to the clamping position, and the drill 20 and die holder 39 are moved forward to the working position. As a final step in the square-motion cycle, the rack assembly 121 is moved one position to the left.

FIGS. 7–9 are enlarged diagrammatic views, partly in section, illustrating the work performed on the cigar head during the working portion of the cycle. At station *b*, the cylindrical head of the cut cigar is received within a guide insert 96 which holds the head of the cigar in alignment while the boring tool 83 bores an axial hole in the head. The guide insert 96 is removable and replaceable with guides having different inside diameters for different sizes of cigar.

While the foregoing boring action is taking place at station *b*, the head of the cigar at station *c* is being pleated by the pleating die 30. As seen in FIG. 8, the illustrated pleating die is shown as comprising six radial bars or rods 130 equally spaced about the circumference of the die. The inward edges of the die bars 130 are slanted or inclined to form a conical pattern so that as the pleating die 30 is moved forwardly over the head of the cigar, six pleats are formed in the cigar wrapper, the pleats being deepest at the outer end of the cigar and becoming progressively less deep as the rear end of the head is approached.

While the cigar at station *c* is being pleated in the manner just described, the head of the cigar at the next station *d* is being preliminarily formed by the forming die 31. The primary function of die 31 is to form shoulders at 131, i.e. at the inward end of the head. These shoulders preferably conform in shape to the interior of the plastic tip 11 at its lower edge.

While the head of the cigar at *d* is being preliminarily shaped in the manner just described, the head of the cigar at station *e* is being slightly compressed by the heated forming die 32, and at the succeeding stations *f* through *k*, the cigar heads are progressively compressed by heated dies into smaller and smaller outside diameters, until at station *k* the final shape of the head is obtained. It will be understood that pleating and forming of the cigar is facilitated by the heat supplied, as from the heater 41, and that such heat also heat sets the cigar head into the shape desired. As indicated previously hereinabove, an important aspect of the method and apparatus of the present invention is that the forming and shaping of the head of the cigar is accomplished by heated pleating and forming dies which are moved on the longitudinal axis of the cigar, rather than at right angles thereto.

While the method and apparatus of the present invention are believed by now to be perfectly clear, an additional figure of drawing, namely, FIGURE 13, has been included to illustrate the important steps carried out by the method of the present invention and performed by the apparatus thereof. At the extreme left in FIGURE 13 is shown a cylindrical cigar open at both ends. Unless the cigar is very loosely packed, a first step in the method is to bore the head of the cigar, as by the boring tool 83, while the head is held axially centered in a guide 96, thereby to provide room for tobacco to be squeezed thereinto during the forming steps. As indicated above, the boring step may be omitted in some cases, where the cigar is loosely packed. Next, the head of the cigar is pleated, by a heated pleating die such as 30. Then the shoulder 131 of the head is formed, as by the heated shoulder-forming die 31. The head of the cigar is then progressively compressed into a frusto-conical configuration of reduced-diameter, as by a series of heated forming dies 32–38. Glue is then applied to the head, as by a spot applicator 210, and finally the tip 11 is inserted onto the formed head of the cigar.

While the cigars 10 have been described as being of the cut cylindrical type, the method and apparatus of the present invention could, of course, be applied to other types and shapes of cigars, as for example, cigars having square or other cross section configuration.

The preferred embodiment of this invention has been described in some detail. It will be obvious, however, to one skilled in the art that various modifications may be made without departing from the scope of the disclosure herein.

Having described my invention, I claim:

1. Apparatus for forming the head of a cigar to receive a plastic or like tip, said apparatus comprising:
    (1) pleating means for pleating one end of the cigar externally at circumferentially spaced locations;
    (2) compression means for compressing the pleated end progressively to smaller diameter;
    (3) said compression means being adapted to apply pressure having a radially inward component and also an axial component;
    (4) said compression means comprising a plurality of forming dies arranged at successive stations;
    (5) each succeeding die having an interior diameter smaller than that of the die immediately preceding it;
    (6) and means for moving the forming dies on the axis of the cigar.

2. Apparatus according to claim 1 characterized in that boring means are provided for boring said one end of said cigar axially prior to subjecting said cigar to the pleating and compression means.

3. Apparatus according to claim 1 characterized in that the pleating means comprises a pleating die, and includes means for moving the pleating die on the cigar axis.

4. Apparatus according to claim 2 characterized in that the pleating means comprises a pleating die, and includes means for moving the pleating die on the cigar axis.

5. Apparatus according to claim 1 characterized in that heating means are provided for heating the pleating means and the compression means.

6. Apparatus according to claim 2 characterized in that heating means are provided for heating the pleating means and the compression means.

7. Apparatus according to claim 3 characterized in that heating means are provided for heating the pleating means and the compression means.

8. Apparatus according to claim 4 characterized in the heating means are provided for heating the pleating means and the compression means.

9. Apparatus according to claim 3 characterized in that holding means are provided for holding the cigars against the thrust of the pleating die and forming dies.

10. Apparatus according to claim 9 characterized in that means are provided for moving the cigars intermittently in step-by-step fashion through working stations at which are located the said pleating die and forming dies.

11. Apparatus according to claim 10 characterized in that timing means are provided for coordinating the working cycles of the pleating and forming dies with the cigar holding means and means for moving the cigars intermittently.

12. Apparatus according to claim 11 characterized in that at least some of said forming dies are shaped to compress said pleated end of said cigar into a frusto-conical configuration.

13. Apparatus according to claim 6 characterized in that holding means are provided for holding the cigars against the thrust of the boring means, pleating means and compression means.

14. Apparatus according to claim 13 characterized in that means are provided for moving the cigars intermittently in step-by-step fashion through working stations at which are located the said boring means, pleating means, and compression means.

15. Apparatus according to claim 14 characterized in that timing means are provided for coordinating the working cycles of the pleating and forming means with the cigar holding means and means for moving the cigars intermittently.

16. Apparatus according to claim 15 characterized in that at least some of said forming means are shaped to compress said bored and pleated end of said cigar into a frusto-conical configuration.

References Cited

UNITED STATES PATENTS

| | | | |
|---|---|---|---|
| 223,020 | 12/1879 | Wight | 131—253 |
| 511,960 | 1/1894 | Lewis | 131—92 |
| 2,099,963 | 11/1937 | Prager | 131—92 |
| 2,169,166 | 8/1939 | Rober et al. | 131—89 |
| 3,307,559 | 3/1967 | Pallach | 131—88 X |
| 3,398,753 | 8/1968 | Stelzer | 131—92 X |

FOREIGN PATENTS

| | | |
|---|---|---|
| 485,484 | 10/1929 | Germany. |
| 1,045,233 | 10/1966 | Great Britain. |
| 86,609 | 2/1921 | Switzerland. |

SAMUEL KOREN, Primary Examiner

J. H. CZERWONKY, Assistant Examiner

U.S. Cl. X.R.

131—79, 81, 88, 89